United States Patent [19]

Ritze

[11] 3,825,688

[45] July 23, 1974

[54] TELEPHONE ANSWERING APPARATUS WITH SYSTEM FAILURE DETECTION MEANS

[75] Inventor: Arno Ritze, Munich, Germany

[73] Assignee: Compur-Werk Gesellschaft mit beschrankter Haftung & Co., Munchen, Germany

[22] Filed: Dec. 6, 1972

[21] Appl. No.: 312,786

[30] Foreign Application Priority Data

Dec. 10, 1971 Germany .......... 2161530

[52] U.S. Cl. .......... 179/6 R
[51] Int. Cl. .......... H04m 11/10
[58] Field of Search ...... 179/6 R, 6 E, 5.5, 175.2 C, 179/17 B, 81 B

[56] References Cited

UNITED STATES PATENTS

| | | | |
|---|---|---|---|
| 2,835,737 | 3/1958 | Shively | 179/6 R |
| 3,466,396 | 9/1969 | Guimond | 179/6 E |

*Primary Examiner*—Bernard Konick
*Assistant Examiner*—David K. Moore
*Attorney, Agent, or Firm*—Stonebraker & Shepard

[57] ABSTRACT

Telephone answering apparatus having a recording appliance connectable with the answering apparatus, and receiving its service voltage from the answering apparatus. The circuitry within the answering apparatus is such that if the recording appliance is not properly and effectively connected to the telephone answering apparatus, the answering apparatus is rendered ineffective to answer an incoming call. This is accomplished by an electronic switch in the telephone answering apparatus (the switch preferably being in the form of a transistor) responsive to variations in the resistance conditions of the circuit, the arrangement being such that when the recording appliance is properly connected and operative, the telephone answering apparatus is operatively connected to the incoming telephone line, but when the recording appliance is not properly connected and functioning, the connection between the call circuit and the incoming telephone line is ineffective. This is accomplished by the circuitry of the present invention even though the wiring connection between the telephone answering apparatus and the recording appliance may be of very simple form, such as a three wire cable.

7 Claims, 1 Drawing Figure

PATENTED JUL 23 1974 3,825,688
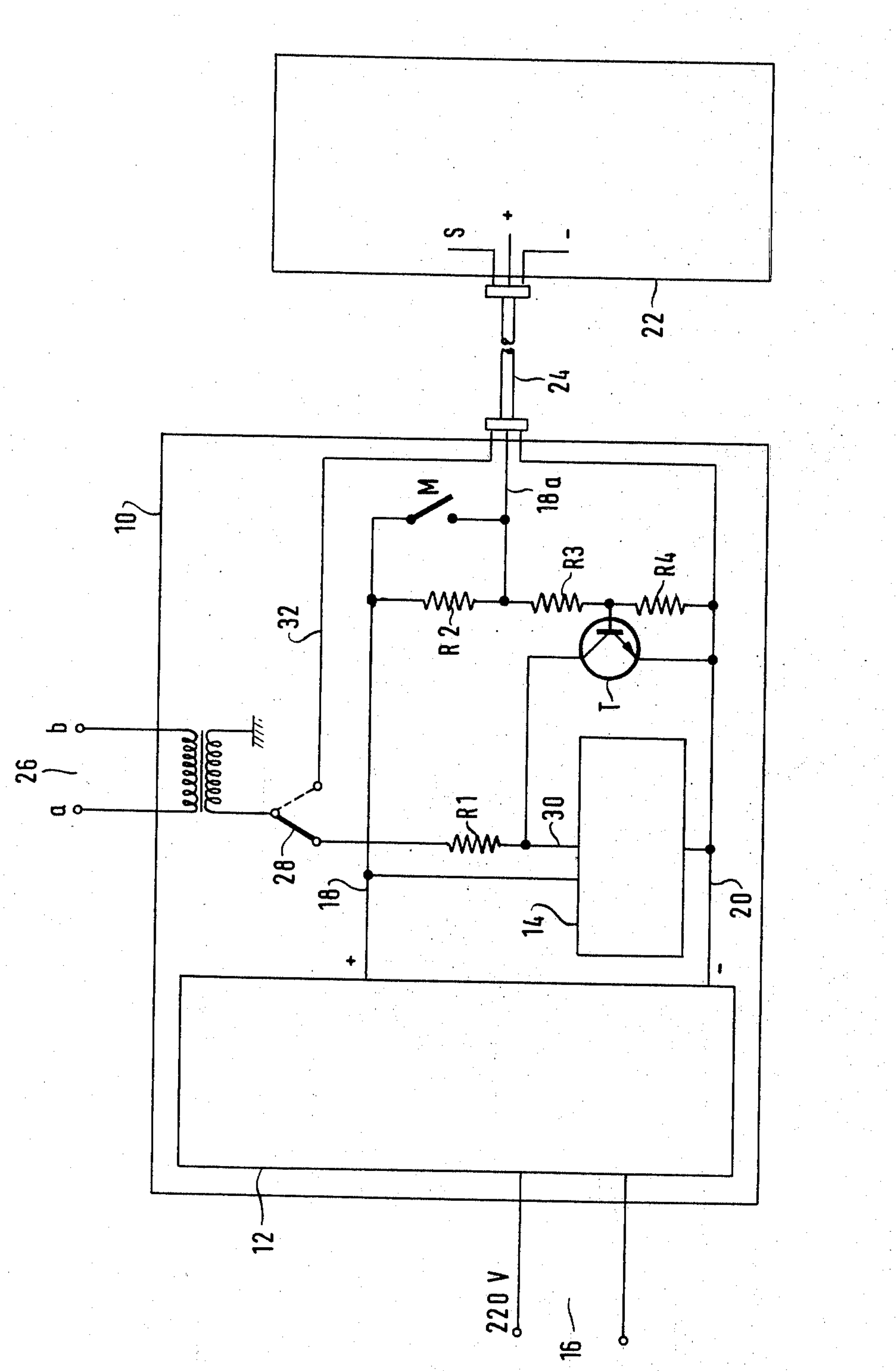

TELEPHONE ANSWERING APPARATUS WITH SYSTEM FAILURE DETECTION MEANS

BACKGROUND OF THE INVENTION

This invention relates to a telephone answering apparatus with a recording appliance connectable to the answering apparatus and receiving its service voltage from the answering apparatus.

In certain known apparatus of this kind, a signal from the exchange line (the incoming telephone line) has a test signal extracted therefrom in a special control circuit of the recording appliance, and this is conducted to the answering apparatus, for example through a conductor connected to the headphone connection of the recording appliance. At the apparatus, said test signal operates the control function necessary to bring the appliance into action. When the recording appliance is properly connected up, and consequently when the test signals are received, the appliance is switched on, ready for use. This arrangement has the disadvantage, however, that it requires a coupling conductor between the answering apparatus and the recording appliance in addition to the special control circuit in the appliance, so that a substantial cable connection is required for the transmission of test signals in addition to the coupling conductors and terminals for the service voltage and for the sound transmission. This accordingly increases the installation cost and the chances of faulty operation.

It is an object of the present invention to avoid these disadvantages and, by using simple means, to secure a reliable arrangement which will permit the answering apparatus to become live or operative only when the recording appliance is properly connected. This object is accomplished in the present invention by having an electronic switch associated with the call circuit of the answering apparatus. This switch is adapted to maintain or to break the connection between the telephone exchange line and the call circuit, in response to differing resistance conditions in the connections to the recording appliance arising respectively from correct connection or non-connection of the recording appliance.

In the preferred embodiment of the invention, the electronic switch is constituted by at least one transistor which blocks the call circuit if the recording appliance is not correctly connected to the answering apparatus.

In accordance with a further feature of the invention, the current and sound transmission from the answering apparatus to the recording appliance takes place over a single coupling cable. This arrangement provides optimum coupling between the two devices and affords a simple and reliable servicing of the recording appliance in a particularly advantageous way.

BRIEF DESCRIPTION OF THE DRAWING

The single FIGURE of the drawing is a wiring diagram schematically illustrating a preferred form of the invention.

DESCRIPTION OF THE PREFERRED EMBODIMENT

Referring now to the wiring diagram, the telephone answering apparatus is designated in general at 10. It comprises a power pack 12 and a call circuit 14. The power pack 12 is connected to mains (current supply conductors) through a suitable conventional coupling 16, which may be a conventional plug to plug into an outlet. The mains or supply voltage of, for example, 220 volts, is reduced in the power pack 12 to a service voltage of about 7 volts, and applied through conductors 18, 18*a*, and 20 to a recording appliance 22, for example a tape recorder of conventional known type. The power pack 12 is also of conventional known form. A plug-in cable 24 provides the conducting coupling between the separate units 10 and 22.

A second coupling 26 connects the telephone exchange line (circuit wires indicated at *a* and *b*) to the conventional call circuit 14 through a switch 28, a resistance R1, and a conductor 30. A further conductor 32 leads from one contact of the switch 28, as shown, to the sound pick-up S in the recording appliance 22, for which reason the cable 24 has a third conductor.

As shown in the diagram, three resistors R2, R3, and R4 are arranged in series with each other between the conductors 18 and 20, and serve as a voltage divider. The conductor 18*a* is tapped off between the resistors R2 and R3. A transistor T has its base connected between the resistors R3 and R4. The collector of the transistor is connected to the conductor 30 between the resistance R1 and the call circuit 14. The emitter of the transistor is connected to the conductor 20 as shown. A switch M is provided, as shown, between the conductor 18 and the conductor 18*a*, so that when this switch is closed, the resistor R2 is bypassed or short circuited.

If it happens that the recording appliance 22 has inadvertently not been properly connected (e.g., if the plug of the cable 24 has not been pushed in all the way, or if the appliance 22 itself has not been turned on at its main switch) the connection between conductors 18*a* and 20 remains open. Current flows (with the switch M being open at this time) through the resistances R2 and R3 at the base of the transistor T, and makes this transistor conductive. If a call signal is received from the incoming telephone line *a*, *b* via the switch 28 (which is then in the position illustrated in full lines in the drawing) the call signal therefore does not pass to the conductor 30 and thence to the call circuit 14, but on the contrary it is diverted or short-circuited through the collector-emitter part of the transistor T, which is then conductive. The call circuit 14 is consequently blocked, and the answering apparatus 10 cannot function.

When the recording appliance 22 is properly connected up to the answering apparatus 10, it represents only a small resistance in relation to the resistances R3 and R4, so that current now flows through the resistance R2 and the conductor 18a to the recording appliance 22. The consequent voltage drop at the base of the transistor T causes the latter to block or become non-conductive. The call signal from the exchange line therefore passes through the conductor 30 to the call circuit 14, which automatically sets the telephone answering apparatus into operation in conventional known fashion. The caller is then first advised, from an answering tape, that the telephone instrument is not attended but that a message can be taken through a recording appliance. Moreover, the caller is invited to dictate his message, possibly with a time limit being stated, and then the switch 28 is thrown (in conventional known manner, by operation of the answering apparatus) from the full line position illustrated in the drawing to the dotted line position, and at the same time the contact or switch M is closed by the conventional operation of the answering apparatus. The full service voltage is now applied to the recording appliance 22, and the message from the caller is here taken on tape. On termination of the recording, the switches 28 and M are brought back into their original positions (preferably by a time switch) and the program of the answering apparatus and the recording appliance terminates.

It is apparent that the transistor T is controlled in dependence on the differing resistance conditions at the connections 18*a* and 20 for the recording appliance, which conditions are determined by the correct connection or the non-connection of the recording appliance, so as to maintain or break the connection between the telephone exhange line *a, b* and the conductor 30 leading to the call circuit 14. Since this switching arrangement represented by the transistor T is arranged in the answering apparatus, the connection between the apparatus 10 and the appliance 22 required for current and sound transmission can be made by a single cable. As a result, the chances of faulty operation arising from improper coupling when the apparatus is brought into use, are substantially reduced.

Finally, it is pointed out that when use is made of a mechanism which counts the calls received at the answering apparatus, and interrupts the supply of current to the recording appliance after a predetermined maximum number of calls has been reached, and before the end of the storage capacity of the recording tape, a further contact or switch in the conductor 18*a* has to be opened by the counting mechanism, whereby the transistor T is made conductive, the call circuit 14 is blocked, and the complete apparatus is thereby stopped in the manner previously described.

What is claimed is:

1. Telephone answering apparatus with a separate recording appliance selectively connectable thereto, said answering apparatus comprising a call circuit (14), a connection from a telephone exchange line (*a, b*) to said call circuit, connection means (24) for connecting said answering apparatus to said recording appliance, said connection means forming different resistance characteristics depending on whether said recording appliance is correctly connected or not connected to the answering apparatus, and electronic switch means associated with said call circuit for maintaining or breaking the connection between said telephone exchange line and said call circuit, said electronic switch means being responsive to said different resistance characteristics of said connection means.

2. Apparatus as defined in claim 1, wherein said electronic switch means includes at least one transistor (T) which blocks the call circuit (14) when the recording appliance (22) is not properly connected up to said telephone answering apparatus.

3. Apparatus as defined in claim 1, wherein said connection means through which current and sound transmission take place from said telephone answering apparatus to said recording appliance is provided as a single plug-in cable (24).

4. A construction as defined in claim 3, in which said cable (24) comprises two conductors (18*a*, 20) for supplying operating current from said telephone answering apparatus to said recording appliance, and at least one additional conductor (32) for sound transmission.

5. Telephone answering apparatus comprising a call circuit unit (14) adapted to be activated by an incoming call from an incoming telephone line (26) to answer such incoming call, a message recording unit (22) separate from said call circuit unit, connecting means (24) connecting said answering apparatus to said recording unit, said connecting means forming a conductive path of relatively low resistance when said connecting means is properly connected to said answering apparatus and said recording unit, with said recording unit turned on, said connecting means forming a substantially non-conductive path when said recording unit is turned off and also when said connecting means is not properly connected, and responsive means connected to said call circuit and responsive to the conductive condition of said connecting means for intercepting an incoming call and preventing it from activating said call circuit unit so long as said connecting means is in a non-conductive condition and for allowing an incoming call to activate said call circuit unit when said connecting means is in a conductive condition.

6. Apparatus as defined in claim 5, wherein said responsive means is switch means serving, when conductive, to short circuit an incoming call conductor so that the incoming call does not effectively reach said call circuit unit.

7. Apparatus as defined in claim 5, wherein said connecting means is a cable including two conductors, and said responsive means comprises a voltage divider connected between said two conductors, a transistor having its base connected to an intermediate point of said voltage divider, and a by-pass circuit for by-passing an incoming call around said call circuit unit, said by-pass circuit including the collector and the emitter of said transistor, so that when said transistor is conductive said by-pass circuit will be operative to by-pass an incoming call and when said transistor is non-conductive said by-pass circuit will be inoperative.

* * * * *